(12) United States Patent
Burkett et al.

(10) Patent No.: US 11,839,199 B2
(45) Date of Patent: Dec. 12, 2023

(54) BEEHIVE WIND SHIELD

(71) Applicant: WiSys Technology Foundation, Inc., Madison, WI (US)

(72) Inventors: Edward W. Burkett, South Range, WI (US); Kenneth H. Raihala, Superior, WI (US)

(*) Notice: Subject to any disclaimer, the term of this patent is extended or adjusted under 35 U.S.C. 154(b) by 733 days.

(21) Appl. No.: 16/209,074

(22) Filed: Dec. 4, 2018

(65) Prior Publication Data
US 2019/0166806 A1 Jun. 6, 2019

Related U.S. Application Data

(60) Provisional application No. 62/594,392, filed on Dec. 4, 2017.

(51) Int. Cl.
*A01K 47/06* (2006.01)

(52) U.S. Cl.
CPC .................................... *A01K 47/06* (2013.01)

(58) Field of Classification Search
CPC ................................ A01K 47/06; A01K 47/00
USPC .......................................................... 449/20
See application file for complete search history.

(56) References Cited

U.S. PATENT DOCUMENTS

| | | | | |
|---|---|---|---|---|
| 50,179 A * | 9/1865 | Spinney | ................. | A01K 47/00 449/34 |
| 290,022 A * | 12/1883 | Fraley | .................... | A01K 53/00 449/10 |
| 620,859 A * | 3/1899 | Taylor | .................... | A01K 47/00 449/16 |
| 1,492,429 A * | 4/1924 | Cottam | .................. | A01K 47/06 449/16 |
| 1,584,775 A * | 5/1926 | Jonian | .................... | A01K 47/00 449/13 |
| 2,292,110 A * | 8/1942 | Evans | .................... | A01K 47/00 449/14 |
| 2,709,820 A * | 6/1955 | Wahl | ...................... | A01K 47/00 449/14 |
| 2,895,185 A | 7/1959 | Preaus | | |
| 3,185,243 A * | 5/1965 | Burback | ................ | B60K 11/08 180/68.1 |
| 4,192,138 A * | 3/1980 | Szema | .................... | F23R 3/045 431/351 |
| 4,199,832 A * | 4/1980 | Glasscock | .............. | A01K 47/00 156/78 |
| 4,257,133 A * | 3/1981 | Steinrucken | .......... | A01K 47/06 449/12 |
| 4,300,250 A * | 11/1981 | Taylor | .................... | A01K 47/06 449/12 |

(Continued)

FOREIGN PATENT DOCUMENTS

| | | | | |
|---|---|---|---|---|
| JP | 3203946 U | * | 4/2016 | ............. A01K 47/06 |
| KR | 880002640 Y1 | * | 7/1988 | ............. A01K 47/02 |
| KR | 20150109176 A | * | 10/2015 | ............. A01K 47/06 |

*Primary Examiner* — Peter M Poon
*Assistant Examiner* — Carly W. Lynch
(74) *Attorney, Agent, or Firm* — Boyle Fredrickson S.C.

(57) ABSTRACT

A wind shield supported by a beehive bottom board prevents directly impinging wind from creating high-pressure differences across the beehive such as promote excessive ventilation. By providing an entry path that opens upward and follows a twisted path, proper ventilation and access to the beehive by the bees may be maintained. The wind shield may be quickly installed on a variety of beehive designs and easily removed during warm weather.

13 Claims, 5 Drawing Sheets

(56) References Cited

U.S. PATENT DOCUMENTS

| | | | |
|---|---|---|---|
| 4,402,099 A | | 9/1983 | Platt |
| 4,958,652 A | * | 9/1990 | Maya ..................... E04H 15/58 |
| | | | 135/87 |
| 5,019,011 A | | 5/1991 | Williams et al. |
| 7,632,167 B1 | | 12/2009 | Miller |
| 9,101,116 B1 | | 8/2015 | Watson |
| 2019/0289830 A1 | * | 9/2019 | Williams ............... A01K 47/04 |

* cited by examiner

BEEHIVE WIND SHIELD

CROSS REFERENCE TO RELATED APPLICATION

This application claims the benefit of U.S. Provisional Application No. 62/594,392, filed Dec. 4, 2017 and hereby incorporated by reference.

STATEMENT REGARDING FEDERALLY SPONSORED RESEARCH OR DEVELOPMENT

BACKGROUND OF THE INVENTION

The present invention relates to a wind shield for beehives allowing passage of bees and ventilation of the beehive while reducing the effects of frigid temperatures and precipitation.

Honey bee keeping as a backyard hobby or as a commercial enterprise has been popular since the middle of the 18th century although early cave drawings in Spain show Spaniards harvesting wild honey thousands of years BC.

One of the many rewards for those harvesters and beekeepers was the golden honey extracted from the beehives. There are times, however, when beekeepers may face harsh winter weather especially in the north climates that can result in a substantial loss of bees to the frigid temperatures. Under those conditions, honeybees cannot maintain adequate heat within the beehive, become chilled and die.

The beehive must be generally kept open both to allow entrance and exit of bees and provide adequate air circulation so that the bees may maintain proper air temperature and humidity. Accordingly, solutions have addressed insulating the beehive cover or beehive walls, for example, with roofing felt, or surrounding the beehives with fencing or shrubbery to shield the beehives from weather and cold temperatures.

SUMMARY OF THE INVENTION

The present inventors have recognized that improved resistance against frigid temperatures can be provided by a wind shield that prevents directly impinging wind from creating high-pressure differences across the beehive such as to promote excessive ventilation. The wind shield provides an entry path that opens upward and follows a twisted path allowing proper ventilation and access to the beehive by the bees.

In one embodiment, the wind shield may fit around and optionally be supported by a standard beehive bottom board allowing the wind shield to be quickly installed on a variety of beehive designs and easily removed when desired.

In an alternative embodiment, the wind shield attaches to the front of the beehive and is supported by a standard beehive bottom board allowing the wind shield to be quickly installed on a variety of beehive designs and easily removed when desired.

It is thus a feature of at least one embodiment of the present invention to allow the wind shield to fit any 10 deep or 8 deep standard super frame with the dimensions of the wind shield pre-sized for these standard lengths.

Specifically then, the invention provides a cowling positionable to abut at an upper edge a front vertical wall of a rectangular brood super housing resting upon a top edge of a bottom board having a horizontal floor supporting on three sides an upstanding frame providing an open front side, the upstanding frame blocking airflow between the upstanding frame and the contacting brood super housing so that the bottom board extends horizontally forward beyond the front vertical wall of the brood super to provide a cantilevered ledge at the open front side, the open front side providing a vertical gap provided between a lower edge of the brood super and an upper surface of the horizontal floor spaced by the upstanding frame and allowing ventilation air to pass from outside the beehive to inside the beehive. The cowling is further positionable above the open front side and to extend forward therefrom downwardly over the bottom board to provide a gap between a forwardmost edge of the bottom board and then extending rearwardly under the bottom board to provide a concave enclosure enclosing at least an upper and the forwardmost edge of the cantilevered ledge and to provide a gap under the bottom board allowing for an upward path of air into the concave enclosure and an exit and entrance for the bees.

It is thus a feature of at least one embodiment of the present invention to insulate the entrance of a bee hive to impinging wind while still allowing bees and necessary air circulation to enter and exit the bee hive in one general direction (upward flowing air).

The cowling may provide vertically extending sidewalls covering opposite sides of the concave enclosure.

It is thus a feature of at least one embodiment of the present invention to shield rearward and side directional wind gusts from entering the bee hive.

The sidewalls may abut the front surface of the brood super to block air flow.

It is thus a feature of at least one embodiment of the present invention to correlate the dimensions of the cowling and the beehive in order to seal the interface between the wind shield and brood super.

The sidewalls may fit inside the upstanding frame to be aligned thereby.

It is thus a feature of at least one embodiment of the present invention to provide for alignment of the cowling and beehive through the sidewalls and upstanding frame elements.

The sidewalls may provide horizontal edges which rest on an upper surface of the bottom board.

It is thus a feature of at least one embodiment of the present invention to allow the windshield to be supported by the weight of the windshield against the cantilevered ledge of the bottom board.

The sidewalls may abut the outer left and right sides of the brood super.

It is thus a feature of at least one embodiment of the present invention to enclose the entire cantilevered ledge within the windshield to minimize ingress or egress of horizontal winds through gaps.

An inner surface of the sidewalls may support inwardly extending supports which rest on the upstanding frame of the bottom board.

It is thus a feature of at least one embodiment of the present invention to allow the windshield to be supported by the cantilevered ledge without additional securing elements.

The cowling may attach to a front surface of the front vertical wall with fasteners, the cowling thus separable and connectable without tools. The fasteners may be spring clips, Velcro, or other means known by those in the art.

It is thus a feature of at least one embodiment of the present invention to install the windshield on preexisting bee hives with minimal tools or attachment accessories.

The cowling may slope downwardly forward from the front wall beyond the frontmost edge of the cantilevered ledge.

It is thus a feature of at least one embodiment of the present invention to allow rain and snow to fall off the windshield through gravity forces.

The downward slope of the cowling may increase as the cowling moves farther away from the front wall.

It is thus a feature of at least one embodiment of the present invention to provide easy manufacture of the cowling using PVC pipe or another readily available material such as plastic, waterproof paper, wood products, or extruded foam.

The windshield assembly may further add a wind block extending downwardly and abutting a lower surface of the bottom board to block airflow.

It is thus a feature of at least one embodiment of the present invention to prevent wind from passing horizontally in a rearward direction underneath the bee hive without entering the hive.

The downward sloping edge of the cowling may be textured to provide a landing surface for the bees.

The cowling may be a semi-cylindrical shell. The semi-cylindrical shell may have a circumference of less than 180 degrees.

It is thus a feature of at least one embodiment of the present invention to construct the cowling out of a durable PVC material, or another readily available material such as plastic, waterproofed paper, wood products, insulating foam, or extruded foam.

The present invention may further provide a rectangular brood super housing and a bottom board having a horizontal floor supporting on three sides an upstanding frame providing an open front side, the upstanding frame sized to support thereabove the rectangular brood super housing resting upon a top edge of the upstanding frame to block airflow between the upstanding frame and the contacting brood super housing so that the bottom board extends horizontally forward beyond a front vertical wall of the brood super to provide a cantilevered ledge at the open front side, the open front side providing a vertical gap provided between a lower edge of the brood super and an upper surface of the horizontal floor spaced by the upstanding frame and allowing ventilation air to pass from outside the beehive to inside the beehive.

It is thus a feature of at least one embodiment of the present invention to provide a bottom board customized for the wind shield of the present invention. It is also a feature of at least one embodiment of the present invention to provide a circuitous path of air from outside the beehive to inside the beehive reducing the velocity of the incoming airflow.

The present invention may further provide a rectangular queen super housing separated by the brood super by a queen excluder filter preventing a queen bee from passing from the queen super to the brood super; and an inner cover having a ventilation hole allowing for the upward path of air between the vertical gap and the ventilation hole.

The present invention may further provide an entrance reducer positioned within the vertical gap to reduce the size of the gap.

These particular objects and advantages may apply to only some embodiments falling within the claims and thus do not define the scope of the invention.

DETAILED DESCRIPTION OF THE PREFERRED EMBODIMENT

Figure 1:
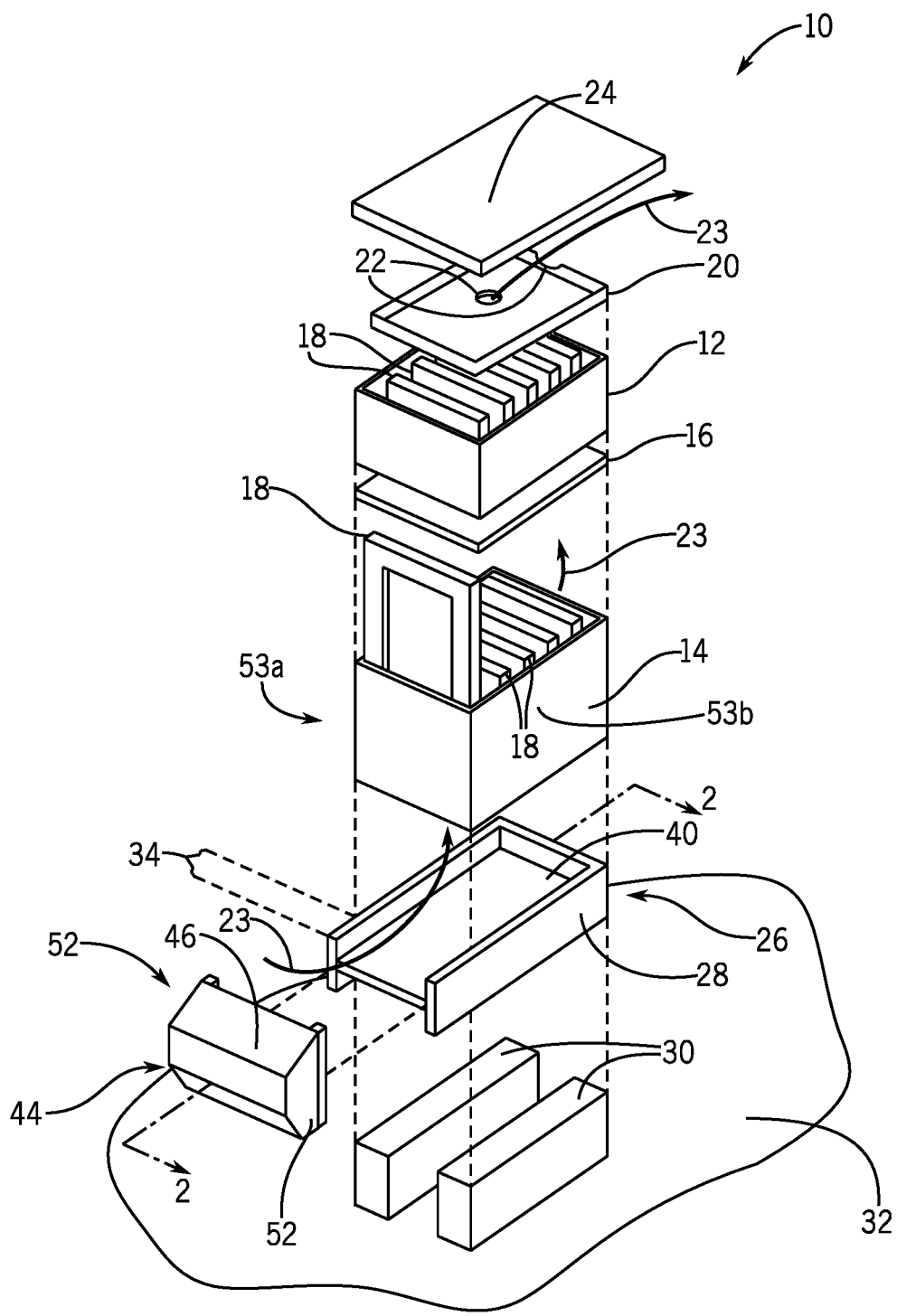
FIG. 1 is an exploded perspective view of an example beehive for use with the present invention showing a cantilevered bottom board and the wind shield that may fit over the bottom board.

Referring now to FIG. 1, a beehive 10 may provide a stacked arrangement providing rectangular boxes forming: a honey super 12 (holding honey for extraction), positioned above and supported by one or more brood supers 14 (holding honey and the brood). The honey super 12 and brood supers 14 are open at the top and bottom for ventilation and access but may be separated by a shallow queen excluder 16, the latter preventing the queen from passing from the brood super 14 to the honey super 12 by means of a set of calibrated openings sized to allow bees other than the queen, only, to pass therethrough. The shallow queen excluder 16 is optionally included.

Each of the honey super 12 and brood super 14 may support multiple parallel, vertically extending frames 18 holding wax on a supporting material such as wire or plastic. The frames 18 provide a substrate for honey comb and are removable, for example, by upward sliding, for inspection of the honeycomb or honey extraction.

The upper end of the honey super 12 is covered by an inner cover 20 having vent passageways 22 through which ventilation air 23 may pass from the honey super 12. The inner cover 20 may be covered by an oversized outer cover 24 to provide protection of the hive 10 from rain or the like while still permitting free passage of the ventilation air 23.

Figure 2:
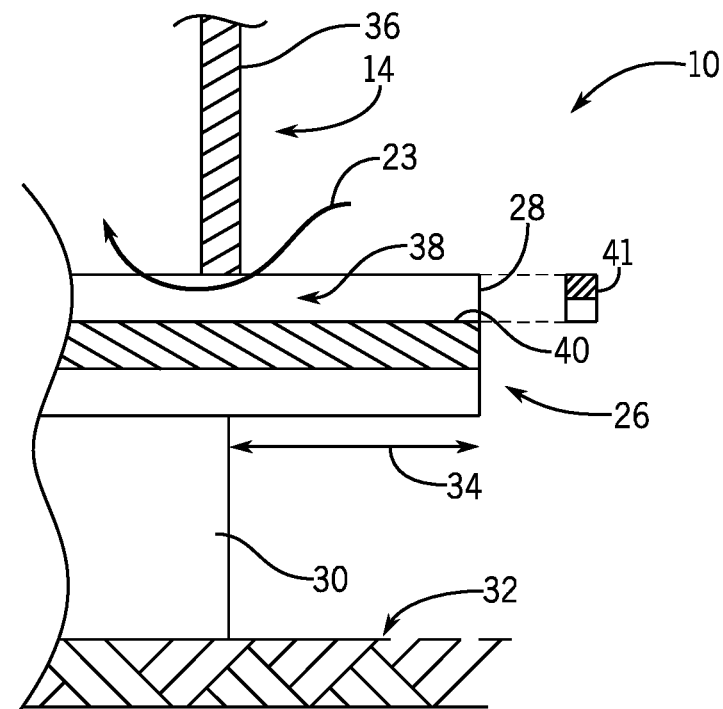
FIG. 2 is a side cross-sectional view along line 2-2 of FIG. 1 showing the entrance path for air and bees in the beehive of FIG. 1 without the wind shield.

Referring now also to FIG. 2, a lower edge of the brood super 14 may rest on a bottom board 26 and specifically on the top edge of a three-sided upstanding frame 28 that serves to space the bottom edge of the brood super 14 from a stand 30, for example, the latter resting on the ground 32 and spacing the hive 10 from the ground. Within the bottom board 26, a bottom panel 40 may extend horizontally within the frame 28. This bottom panel 40 may be solid, or may have a screen positioned above a removable insert such as a sticky board for the capture of debris and mites.

A front side of the frame 28 is open to allow ventilation air 23 to pass in from a front side of the beehive 10 through a gap 38 between a lower edge of the front wall 36 of the brood super 14 and the upper surface of the bottom panel 40. This ventilation air 23 may move upward through the brood super 14, the queen excluder 16 (optionally included), and the honey super 12 to exit the beehive 10 through the inner cover 20 by natural convective ventilation. The gap 38 may optionally be filled with an entrance reducer 41 intended to reduce the opening of the gap 38 to protect the beehive 10 from mice or the like.

The frame 28 and bottom panel 40 extend by a cantilevered distance 34 horizontally beyond a front wall 36 of the brood super 14, for example, to provide a ledge offering a landing position for bees.

First Embodiment

Figure 3:
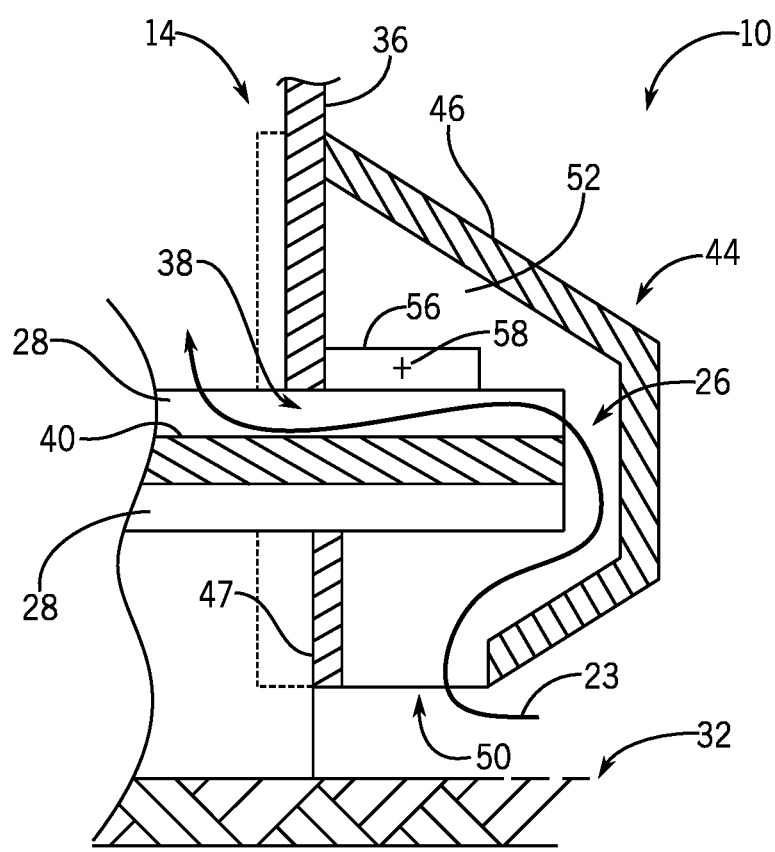
FIG. 3 is a figure similar to that of FIG. 1 with the wind shield installed.

Referring now to FIGS. 1 and 3, a wind shield 44 of the present invention may provide for a horizontally extending cowling 46 providing a concave enclosure partially fitting over the bottom board 26 to enclose the gap 38. An upper edge of the wind shield 44 horizontally abuts a full width of the front surface of the front wall 36 of the brood super 14 above the bottom board 26 at one edge and slopes downwardly forward from that front wall 36 forward beyond the cantilevered end of the bottom board 26. The slope helps direct rain and other precipitation away from the beehive 10. The distal edge of the windshield 44 then joins with a vertical section dropping below the height of the bottom board 26 beyond the front end 27 of the bottom board 26 sufficient in distance to pass bees. This vertical section then joints with a second sloping section which then slopes backward underneath that bottom board 26 to a horizontally extending opening 50. The opening 50 is formed between the downwardly sloping edge of the cowling 46 beneath the bottom board 26 and any support structure 30 having a maximum cross-section along the horizontal plane.

A wind block 47 may extend downward supported by the bottom board 26, positioned to abut a lower surface of the bottom panel 40 of the bottom board 26 preventing a bypassing of the opening 50 by wind passing horizontally (forward or rearward counter flowing wind) underneath the hive 10.

In this regard, the opening 50 is above the ground 32 and provides an upward path of passive air 23 into the cowling 46 directed against the underside of the cantilevered portion 34 of the bottom board 26. This airflow 23 may then flow forward around the front edge of the bottom board 26 and then horizontally into the beehive 10 through the gap 38.

Vertically extending side walls 52 close the left and right side of the cowling 46 and closely abut left and right sides 53a and 53b of the brood super 14 and bottom board so that the cowling 46 provides essentially no ingress of wind or bees except through the lower opening 50. Notably the cowling 46 prevents horizontally directed air currents from directly entering the gap 38 such as could create high-pressure differences between the gap 38 and the vent passageways 22 (shown in FIG. 1) to cause excessive air circulation. Similarly, the cowling 46 blocks airflow and ingress in any direction except upward through opening 50, the air impingement through opening 50 is greatly minimized because of its horizontal orientation and its proximity to the ground 50. In addition, the resistive, twisted path of the air 23 through the cowling 46 limits high velocity airflow.

Figure 4:
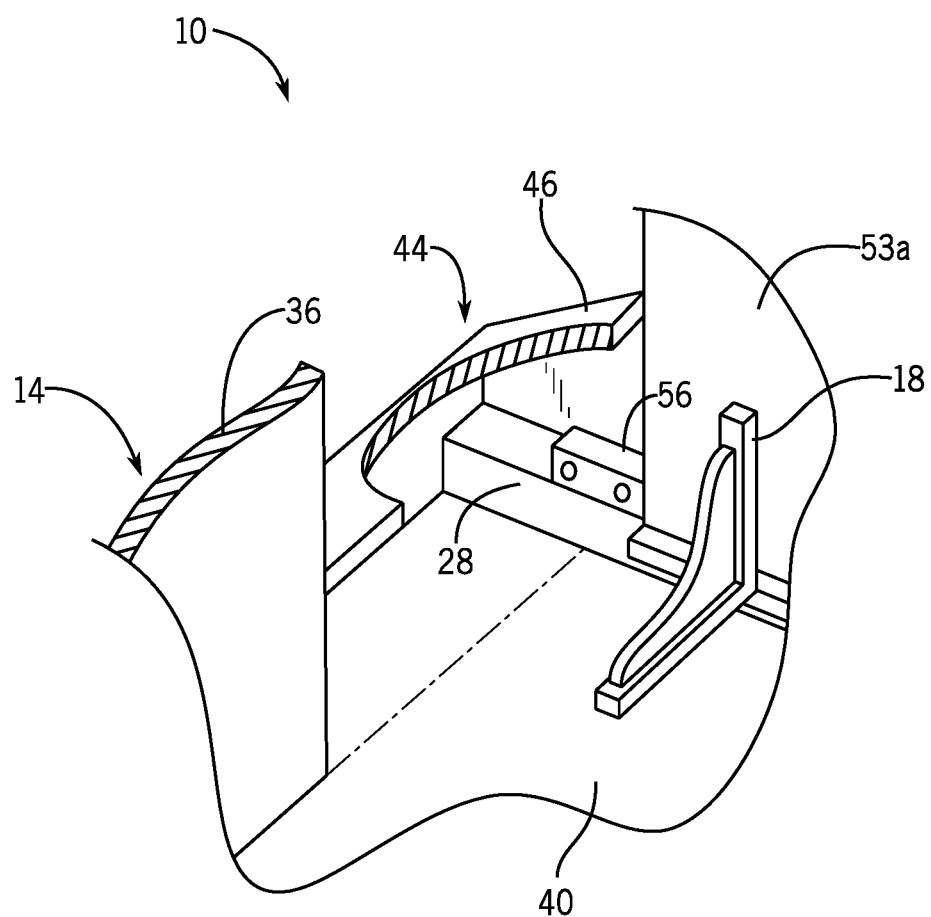
FIG. 4 is a fragmentary perspective view from within the beehive showing side cleats on the wind shield allowing the wind shield to be placed on existing beehives to be fully or partially supported on the bottom board.

Referring now to FIGS. 3 and 4, the cowling 46 may be supported on left and right upper edges of the frame 28 in the cantilevered portion 34 by means of a small cleat block 56 attached to the inner surface of both side walls 52 of the cowling 46 allowing the cowling 46 to be installed simply by positioning it over the bottom board 26 where it is retained by the force of gravity and friction between the cleat block 56 and the frame 28. In this regard, the center of mass 58 of the cowling maybe positioned to be inward from the front edge of the cleat block with respect to the beehive 10. Additional security of the wind shield 44 may be provided by fasteners, pins, adhesive, or other methods.

Second Embodiment

Figure 5:
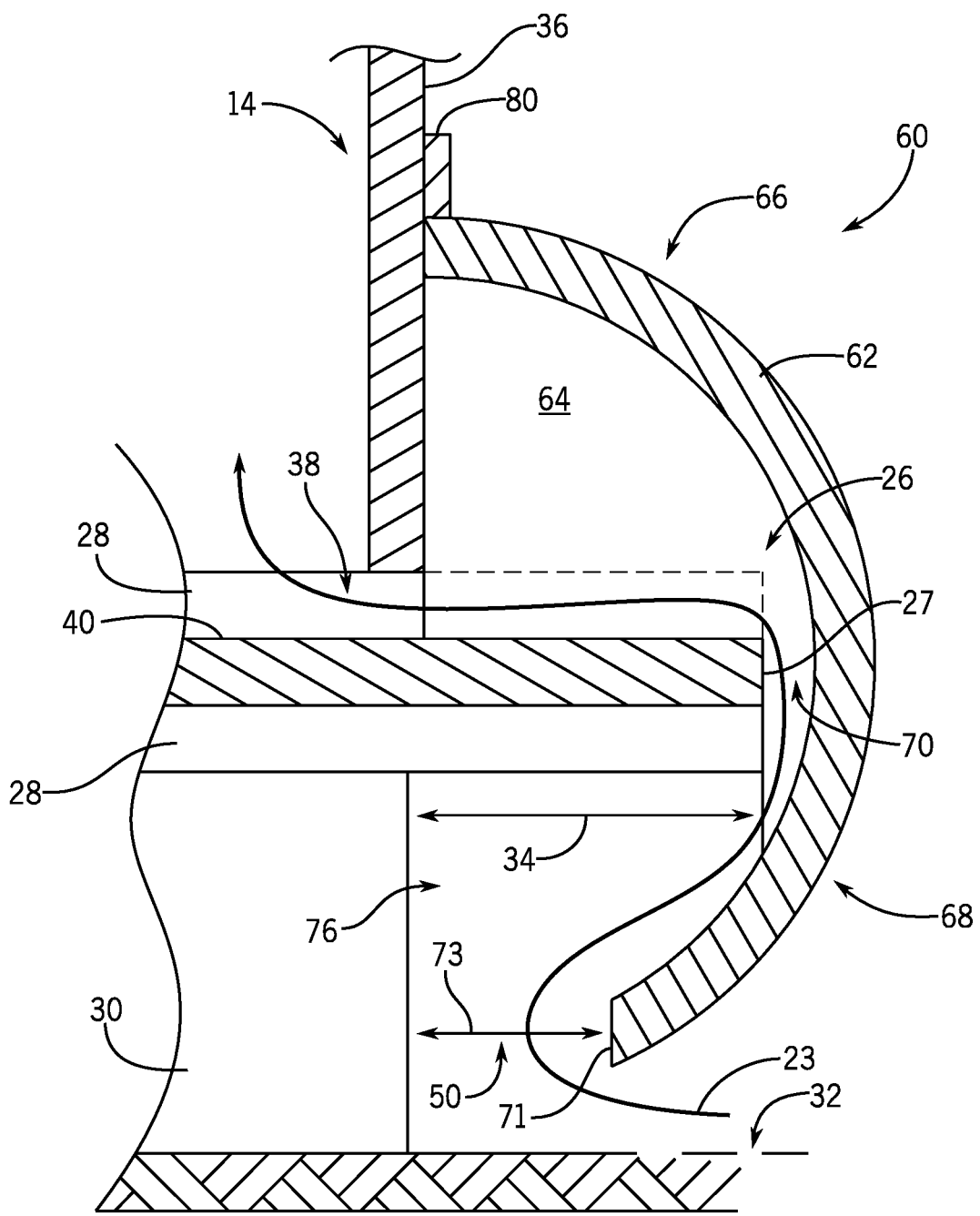
FIG. 5 is a side cross-sectional view similar to FIG. 3 of a second embodiment of the present invention with the wind shield being a semi-cylindrical shell.
Figure 6:
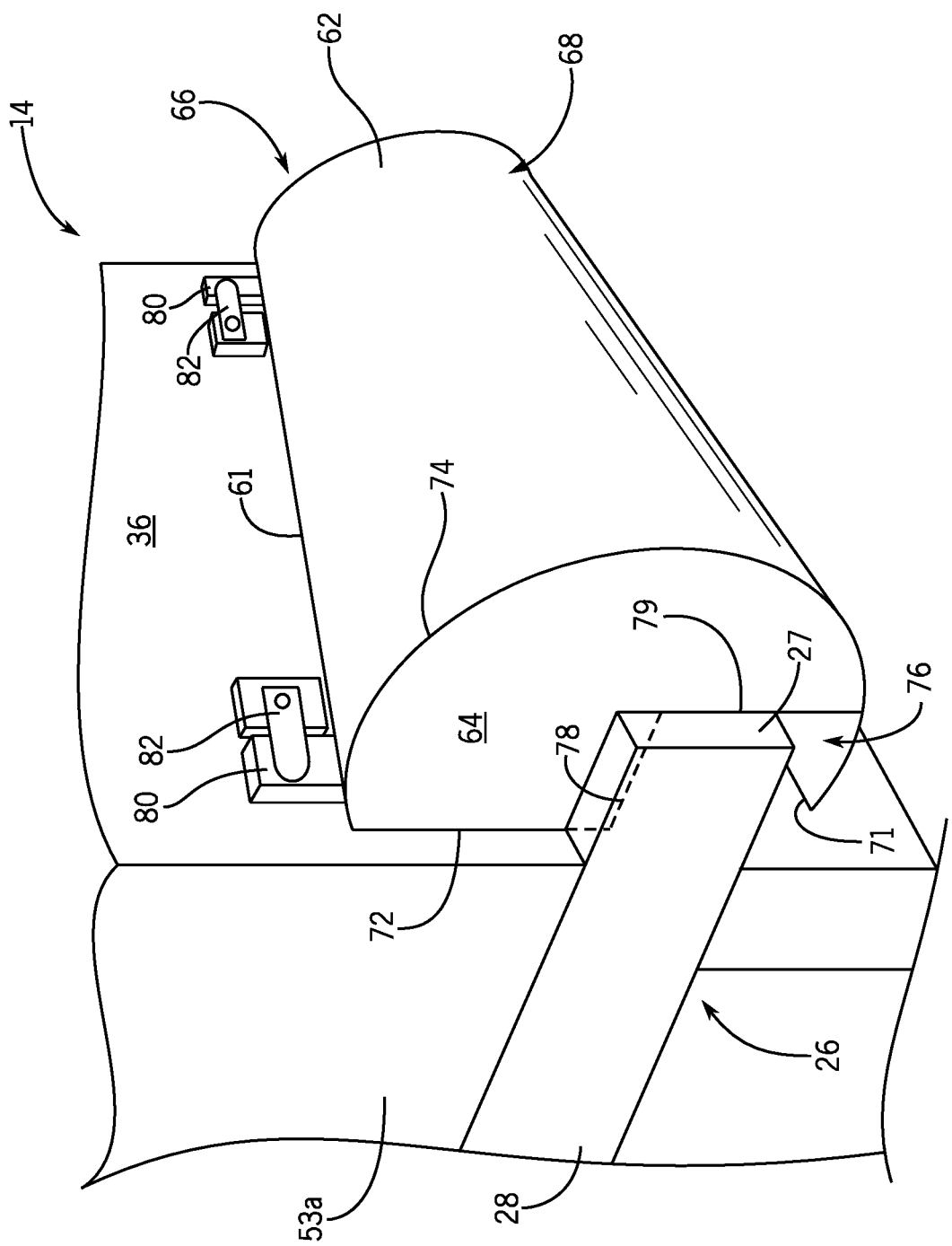
FIG. 6 is a perspective view of the second embodiment shown in FIG. 5 with the wind shield attached to existing beehives by quick release fasteners.

Referring now to FIGS. 5 and 6, a windshield 60 of the present invention may provide a cowling that is a horizontally extending semi-cylindrical shell 62 providing an inwardly concave enclosure with vertically extending side walls 64 covering the opposite ends of the semi-cylindrical shell 62. The windshield 60 receives the bottom board 26 to fit over the bottom board 26 to cover the gap 38 while still allowing ventilation air 23 discussed above.

The semi-cylindrical shell 62 may be formed from four to nine-inch diameter polyvinyl chloride (PVC) pipe having a ¼ inch wall thickness and cut lengthwise to form a semi-cylindrical shell 62 and PVC flat stock cut to form the vertically extending side walls 64. In this regard the semi-cylindrical shell 62 provides a functional replacement for the cowling 46 discussed above albeit simply constructed of a durable PVC material. The semi-cylindrical shell 62 may also be injection molded thermoplastic or thermosetting polymer with the semi-cylindrical shell 62 and vertically extending side walls 64 formed of a unitary piece of plastic.

It is understood that the windshield 60 may be made of any readily available material such as plastic, waterproof paper, wood products, or extruded foam. The material may also be an ultraviolet (UV) resistant material to prevent wear from UV rays.

An upper lengthwise edge 61 of the semi-cylindrical shell 62 horizontally abuts the front surface of the front wall 36 of the brood super 14 above the bottom board 26 and an upper curved portion 66 curves downwardly forward from that front wall 36 forward beyond the cantilevered end of the bottom board 26. The curved slope helps direct rain and other precipitation away from the beehive 10. The forward most point of the curved windshield 44 passes beyond the front end 27 of the bottom board 26 to join a lower curved portion 68 beginning to slope downwardly rearward.

A horizontal gap 70 between the semi-cylindrical shell 62 and the front end 27 of the bottom board 26 is sufficient in distance to pass bees around the bottom board 26. The lower opening 50 is formed between a distal end 71 of the lower curved portion 68 of the semi-cylindrical shell 62 beneath the bottom board 26 and any support structure 30 having a maximum cross-section along the horizontal plane. The semi-cylindrical shell 62 may form a semi-cylinder having a circumference of less than 180 degrees or approximately 140-170 degrees, leaving the lower opening 50 having a width 73 defined by the distance between the distal end 71 and the support structure 30 and extending across the length of the semi-cylindrical shell 62.

In this regard, the opening 50 is above the ground 32 and provides an upward path of air 23 into the semi cylindrical shell 62 directed against the underside of the cantilevered portion 34 of the bottom board 26. This airflow 23 may then flow forward around the front edge 27 of the bottom board 26 and then horizontally into the beehive 10 through the gap 38. A wind block as discussed above may be used to abut a lower surface of the bottom panel 40 of the bottom board 26 preventing a bypassing of the opening 50 by wind passing horizontally forward to rearward underneath the hive 10.

The left and right vertically extending sidewalls 64 enclose the left and right side of the semi cylindrical shell 62 and may provide openings to receive the bottom panel 40 of the bottom board 26 so that the semi cylindrical shell 62 provides essentially no ingress of wind or bees except through the lower opening 50. The left and right vertically extending sidewalls 64 may provide semi-circular walls having a straight edge 72 abutting the front surface of the front wall 36 of the brood super 14 and a curved edge 74 extending along the curved semi cylindrical shell 62. A lower portion of the straight edge 72 includes a rectangular cutout 76 with a horizontal upper edge 78 resting on an upper edge of the bottom panel 40 of the bottom board 26 inward of or inside the upstanding frame 28, and a vertical side edge 79 abutting the front end 27 of the bottom board 26. In this respect, the rectangular cutout 76 allows the left and right vertically extending sidewalls 64 to rest upon and be supported by the bottom panel 40 of the bottom board 26. The alignment of the left and right vertically extending sidewalls 64 inside the upstanding frame 28 provides automatic alignment of the semi cylindrical shell 62 with the gap 38. The ingress of air between the interface of the vertically extending sidewalls 64 and the bottom board 26 is therefore partially shielded by the upstanding frame 28.

The semi-cylindrical shell 62 may be supported on the front surface of the front wall 36 by vertical upwardly extending tabs 80 attached to the upper lengthwise edge 61 of the semi cylindrical shell 62 at outer left and right sides. The vertically extending tabs 80 may then be secured to the front wall 36 by quick release fasteners 82 attached to the front wall 36 and retaining the tabs 80 against the front wall 36 by the force of friction between the fasteners 82 and the front wall 36. The fasteners 82 may be spring clips or other attachment means. The windshield 60 may be easily removed from the brood super 14 and replaced as desired without the use of tools.

The semi cylindrical shell 62 is shown being supported by the bottom board 26 and therefore not extending over the outer edges of the bottom board 26 or abutting the left and right sides 53*a* and 53*b* of the brood super 14. However, as described with respect to the first embodiment, the upper edge of the semi cylindrical shell 62 may alternatively extend a full width of the front surface of the front wall 36 of the brood super 14 such that left and right vertically extending sidewalls 64 closely abut the outer left and right sides 53*a* and 53*b* of the brood super 14 in a similar manner as described above.

Using an initial prototype, preliminary laboratory tests have shown reduced wind infiltration, preventing 90% of entry of 20 mile per hour winds without inhibiting passive ventilation. Bees adapted to the device on the hive and were able to freely enter and leave the hive.

Furthermore, six of eight Wisconsin beehives fitted with prototypes survived a winter season. The 25% hive loss rate suggested a marked improvement over the local average 50% loss for the previous winter seasons as estimated by the Wisconsin Department of Agriculture, Trade and Consumer Protection.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A beehive windshield assembly, the beehive windshield assembly comprising:
    a beehive comprising:
        a rectangular brood super housing; and
        a bottom board having a horizontal floor supporting on three sides an upstanding frame providing a front side opening, the upstanding frame sized to support thereon the rectangular brood super housing resting upon a top edge of the upstanding frame to block airflow between the upstanding frame and the contacting brood super housing so that the bottom board extends horizontally forward beyond a front vertical wall of the brood super housing to provide a cantilevered ledge at the front side opening, the front side opening providing a vertical gap provided between a lower edge of the brood super housing and an upper surface of the horizontal floor spaced by the upstanding frame and allowing ventilation air to pass from outside the beehive to inside the beehive; and
    a cowling positioned to abut the front vertical wall of the brood super housing at an upper edge of the cowling, the cowling further positioned above the front side opening to extend forward therefrom downwardly over and around the bottom board to provide
        a first gap between a forwardmost edge of the bottom board and the cowling to provide a concave enclosure to enclose at least the upper surface and the forwardmost edge of the cantilevered ledge and
        a second gap between an underside of the cantilevered ledge and a lower edge of the cowling allowing for an upward path of air directed along the underside of the cantilevered ledge, upward along the forwardmost edge of the cantilevered ledge, and along the upper surface of the cantilevered ledge into the concave enclosure;
    wherein the cowling is a partial right cylinder shell cut along a length of the cylinder.

2. The assembly of claim 1 wherein the cowling further provides vertically extending sidewalls adapted to cover opposite sides of the concave enclosure.

3. The assembly of claim 2 wherein the sidewalls are adapted to abut a front surface of the brood super housing to block air flow into the opposite sides of the concave enclosure.

4. The assembly of claim 3 wherein the sidewalls are adapted to abut outer edges of the brood super housing.

5. The assembly of claim 3 wherein the sidewalls are adapted to fit inside the upstanding frame to be aligned thereby.

6. The assembly of claim 5 wherein the sidewalls provide horizontal edges adapted to rest on the upper surface of the cantilevered ledge.

7. The assembly of claim 1 further comprising a connector adapted to attach the cowling and a front surface of the front vertical wall, the connector being separable and attachable without tools.

8. The assembly of claim 7 wherein the connector includes at least one spring clip.

9. The assembly of claim 1 wherein the partial right cylinder shell has a circumference of less than 180 degrees.

10. The assembly of claim 9 wherein the partial right cylinder shell is made of at least one of a PVC, plastic, and foam material.

11. The assembly of claim 1 further comprising a wind block extending downwardly and adapted to abut the underside of the cantilevered ledge to block airflow below the bottom board.

12. The assembly of claim 1 further comprising:
an inner cover having a ventilation hole allowing for the upward path of air between the vertical gap of the assembly beehive and the ventilation hole.

13. The assembly of claim 12 further comprising:
an entrance reducer positioned within the vertical gap of the assembly beehive to reduce the size of the vertical gap of the assembly beehive.

* * * * *